US012753198B2

(12) United States Patent
Hood et al.

(10) Patent No.: US 12,753,198 B2
(45) Date of Patent: Oct. 6, 2026

(54) PRECURSORS CONTAINING FLUORINATED ALKOXIDES AND AMIDES

(71) Applicant: ENTEGRIS, INC., Billerica, MA (US)

(72) Inventors: Drew Michael Hood, Newtown, CT (US); Thomas M. Cameron, Newtown, CT (US)

(73) Assignee: Entegris, Inc., Billerica, MA (US)

( * ) Notice: Subject to any disclaimer, the term of this patent is extended or adjusted under 35 U.S.C. 154(b) by 479 days.

(21) Appl. No.: 18/240,873

(22) Filed: Aug. 31, 2023

(65) Prior Publication Data

US 2024/0092816 A1 Mar. 21, 2024

Related U.S. Application Data

(60) Provisional application No. 63/403,390, filed on Sep. 2, 2022.

(51) Int. Cl.
*C07F 7/28* (2006.01)
*C07F 7/00* (2006.01)
*C07F 17/00* (2006.01)

(52) U.S. Cl.
CPC .............. *C07F 17/00* (2013.01); *C07F 7/003* (2013.01); *C07F 7/28* (2013.01)

(58) Field of Classification Search
CPC ........ C01G 23/00; C01G 25/00; C01G 27/00; C07F 7/28
See application file for complete search history.

(56) References Cited

U.S. PATENT DOCUMENTS

| | | | | |
|---|---|---|---|---|
| 3,424,772 A * | 1/1969 | Moshier | C07F 9/005 556/42 |
| 7,956,207 B2 * | 6/2011 | Meiere | C07F 7/10 556/51 |
| 8,039,062 B2 | 10/2011 | Heys et al. | |
| 8,668,957 B2 | 3/2014 | Dussarrat et al. | |
| 2009/0203222 A1 | 8/2009 | Dussarrat | |
| 2015/0176120 A1 | 6/2015 | Lansalot-Matras | |
| 2024/0101582 A1 * | 3/2024 | Hood | C23C 16/45553 |

FOREIGN PATENT DOCUMENTS

| | | | | |
|---|---|---|---|---|
| EP | 1138684 A1 | | 10/2001 | |
| GB | 1009310 A | * | 11/1964 | |
| JP | 2005062522 A | | 3/2005 | |
| JP | 6588965 B2 | | 10/2019 | |
| KR | 20120100397 A | | 9/2012 | |
| KR | 20140074162 A | | 6/2014 | |
| KR | 20170066269 A | | 6/2017 | |
| TW | 201116643 A | | 5/2011 | |
| TW | 201630921 A | | 9/2016 | |
| WO | 2002079211 A1 | | 10/2002 | |
| WO | 2006131751 A1 | | 12/2006 | |
| WO | 2007141059 A2 | | 12/2007 | |
| WO | 2009036046 A1 | | 3/2009 | |
| WO | 2015136365 A1 | | 9/2015 | |
| WO | WO-2016143428 A1 | * | 9/2016 | C07F 7/28 |

OTHER PUBLICATIONS

D. Dhakal et al., 32 Journal of Vacuum Science & Technology A (2014) (Year: 2014).*
F. Edelmann, 61 Advances in Organometallic Chemistry, 55-57 (2013) (Year: 2013).*
M. Zhong et al., 49 Dalton Trans., 1351-1364 (2020) (Year: 2020).*
R. Webster, 46 Dalton Trans., 4483-4498 (2017) (Year: 2017).*
M. Lappert et al., 105 Journal of the American Chemical Society, 302-304 (1983) (Year: 1983).*
V. Tuskaev et al., 71 Russian Chemical Bulletin. 76-82 (Jan. 2022) (Year: 2022).*
D. Bradley et al., 13 Chemical Communications (London), 284 (1965) (Year: 1965).*
M. Morstein et al., 5 Chemical Vapor Deposition, 151-158 (1999) (Year: 1999).*
F. Taw et al., 31 Organometallics, 1484-1499 (2012) (Year: 2012).*
CAS Abstract and Indexed Compounds, F. Taw et al., 31 Organometallics, 1484-1499 (2012) (Year: 2012).*
S. Benjamin et al., 41 Dalton Transactions, 12548-12557 (2012) (Year: 2012).*
CAS Abstract and Indexed Compound, S. Benjamin et al., 41 Dalton Transactions, 12548-12557 (2012) (Year: 2012).*
C. Dey et al., 64 Zeitschrift für Naturforschung, 739-744 (2009) (Year: 2009).*
P. Sartori et al., 76 Angewandte Chemie, 376-377 (1964) (Year: 1964).*
CAS Abstract and Indexed Compound, P. Sartori et al., 76 Angewandte Chemie, 376-377 (1964) (Year: 1964).*
Klösener et al., Synthesis of Mono-, Bis- and Tris (pentafluoroethyl) tin Derivatives, (C2F5) 4-nSnXn (X=Ph, Me, Cl, Br, Cp; n=1-3), Chemistry—A European Journal, vol. 23, No. 34, pp. 8295-8303, 2017.
Tuskaev et al., New catalytic systems based on fluorine-containing titanium (IV) alkoxides for the synthesis of ultrahigh-molecular-weight polyethylene and olefin elastomers, Russian Chemical Bulletin, vol. 71, No. 1, pp. 76-82, 2022.

(Continued)

*Primary Examiner* — Alexander R Pagano

(57) ABSTRACT

The present disclosure relates to the field of precursors, more specifically precursors containing at least one fluorinated group. In some embodiments, the precursors are hafnium, zirconium, and titanium bis(cyclopentadienyl) precursors containing fluorinated alkoxides and amides. In some embodiments, the present disclosure relates to using precursors for deposition of group 4 containing thin films, such as HfOx, ZrOx, and TiOx film applications. These thin films can be used in a variety of applications including semiconductor device structures. The compounds of the present disclosure have been developed and synthesized to generate compounds that provide improvements in film applications, such as HfOx, ZrOx, and TiOx film applications. The improvements to the compounds of the present disclosure include increased molecule stability at delivery temperature and deposition temperature, improvements related to precursor film impurity levels, molecule volatility, molecule melting point, and step coverage.

14 Claims, 4 Drawing Sheets

(56) References Cited

OTHER PUBLICATIONS

Figure 1:
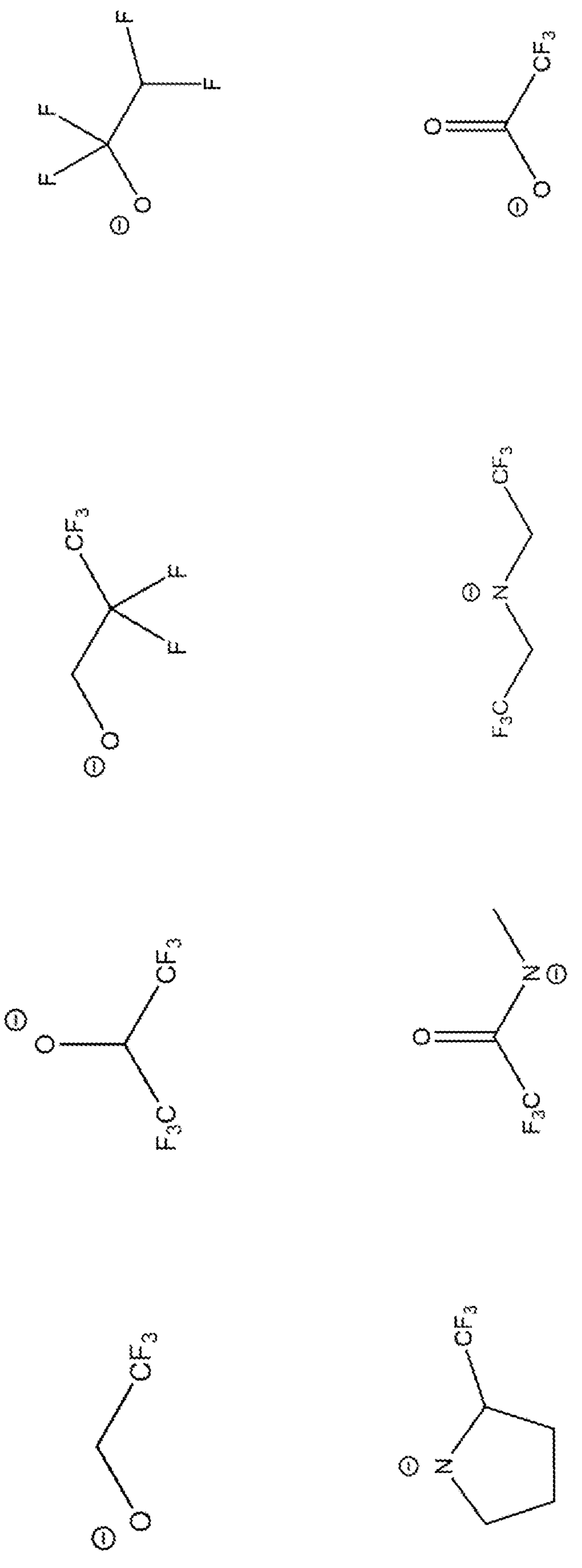

Joon Won Park, Lawrence M. Henling, William P. Schaefer, Robert H. Grubbs, Structure and reactivity of a titanocene (.eta.2-thioformaldehyde) trimethylphosphine complex, Organometallics (1990), 9, 5, 1650-1656. https://doi.org/10.1021/om00119a042.
Li, T., Song, W., Ai, H. et al. β-diiminato titanium complexes with varying fluorine substitution patterns on the N-aryl moiety: probing the effect of ligand substitution on ethylene polymerization, J Polym Res 22, 631 (2015). https://doi.org/10.1007/s10965-014-0631-0.
Lorber, C., Choukroun, R. and Vendier, L., A General and Facile One-Step Synthesis of Imido-Titanium(IV) Complexes: Application to the Synthesis of Compounds Containing Functionalized or Chiral Imido Ligands and Bimetallic Diimido Architectures, Eur. J. Inorg. Chem., (2006), 4503-4518. https://doi.org/10.1002/ejic.200600475.
Norio Yoshino, Junko Tomita, Hidefumi Hirai, Syntheses of Fluoroalkyl and Fluoroaryl Titanates, Bulletin of the Chemical Society of Japan, (1989), 62, 7, 2208-2212, https://doi.org/10.1246/bcsj.62.2208.
Patias, G., Choinopoulos, I., Koinis, S. and Pitsikalis, M., Employing (half-)titanocene complexes as initiators for the synthesis of end-functionalized polylactides by coordination polymerization, J. Polym. Sci. Part A: Polym. Chem., (2018), 56: 2192-2202. https://doi.org/10.1002/pola.29184.
Petzetakis, N., Pitsikalis, M. and Hadjichristidis, N. (2010), Titanium-mediated [CpTiCl2(OEt)] ring-opening polymerization of lactides: A novel route to well-defined polylactide-based complex macromolecular architectures, J. Polym. Sci. A Polym. Chem., 48: 1092-1103. https://doi.org/10.1002/pola.23864.
R. B. Richrath, T. Olyschläger, S. Hildebrandt, D. G. Enny, G. D. Fianu, R. A. Flowers, A. Gansäuer, Cp2TiX Complexes for Sustainable Catalysis in Single-Electron Steps, Chem. Eur. J. (2018), 24, 6371. https://doi.org/10.1002/chem.201705707.
Ruzhang Liu, Juan Wang, Hao Wu, Xianfeng Quan, Shilin Wang, Jiandong Guo, Yang Wang and Heting Lia, Stereocontrol in an intermolecular Schmidt reaction of equilibrating hydroxyalkyl allylic azides, Chem. Commun., (2024), 60, 4362-4365. https://doi.org/10.1039/D4CC00907J.
Couturier S et al., Synthese et reactivite de nouveaux dihydrurozirconocenes et -hafnocenes substitues achiraux et chiraux., Journal of Organometallic Chemistry., pp. 291-306., 1980.
Group 4 Transition Metal-Containing Compounds for Vapor Deposition of Group 4 Transition Metal-Containing Films., 2017.
Mikami Koichi et al., Highly enantioselective synthesis of [alpha]-(perfluoroalkyl)amines via hydrogenation of enamide precursors in the presence of chiraphos-rhodium catalyst., Tetrahedron Asymmetry Pergamon Press Ltd., vol. 21., No. 9., pp. 1158-1161., 2010.
Taw Felicia L. et al., Titanium(IV) Trifluoromethyl Complexes: New Perspectives on Bonding from Organometallic Fluorocarbon Chemistry., Organometallics., vol. 31., No. 4., pp. 1484-1499., 2012.
Wessel Helge et al., Reactions of Group 4 Metal Cyclopentadienyl Trifluorides with a Trimeric Iminoalane., Organometallics., vol. 17., No. 10., pp. 1919-1921., 1998.

* cited by examiner

PRECURSORS CONTAINING FLUORINATED ALKOXIDES AND AMIDES

FIELD

The present disclosure relates to the field of precursors, more specifically precursors containing at least one fluorinated group.

BACKGROUND

Thin films can be used with semiconductor device structures.

SUMMARY

There is a need for new precursors for applications related to 3D-NAND, DRAM, and Logic. As tungsten is replaced by molybdenum in 3D-NAND, a blocking layer is needed to protect the aluminum oxide ($Al_2O_3$). The present disclosure relates to the field of precursors, more specifically precursors containing at least one fluorinated group. In some embodiments, the precursors are hafnium, zirconium, and titanium bis(cyclopentadienyl) precursors containing fluorinated alkoxides and amides. In some embodiments, the present disclosure relates to using the precursors as described herein for deposition of group 4 containing thin films, such as HfOx, ZrOx, and TiOx film applications. These thin films can be used in a variety of applications including semiconductor device structures. The compounds of the present disclosure have been developed and synthesized to generate compounds that provide improvements in film applications, such as HfOx, ZrOx, and TiOx film applications. The improvements to the compounds of the present disclosure include increased molecule stability at delivery temperature and deposition temperature, improvements related to precursor film impurity levels, molecule volatility, molecule melting point, and step coverage.

The precursors of the present disclosure have good stability and volatility. For example, bis(cyclopentadienyl) Hf compounds containing fluorinated ligands can have significantly higher volatility than compounds containing non-fluorinated ligands.

In some embodiments, the compounds are liquid at room temperature.

In some aspects, the techniques described herein relate to a compound including the following formula:

(Formula 1)

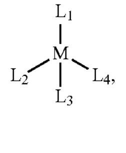

M is Ti, Zr, or Hf; $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F; and $L_2$-$L_4$ are each independently a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H In some aspects, the techniques described herein relate to a compound, wherein the compound has the following formula:

(Formula 2)

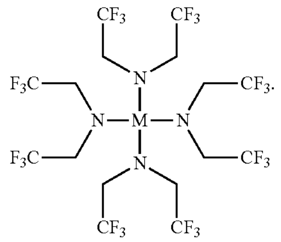

In some aspects, the techniques described herein relate to a compound, wherein $L_1$-$L_4$ are each independently 1,1,1,3,3,3-hexafluoro-2-propoxide, 2,2,3,3,4,4,4-Heptafluoro-1-butoxide, or 2,2,2-trifluoroethoxide.

In some aspects, the techniques described herein relate to a compound, wherein $L_1$-$L_4$ are trifluoroacetate.

In some aspects, the techniques described herein relate to a compound including the following formula:

(Formula 3)

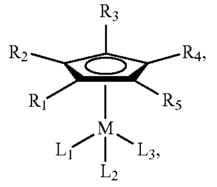

wherein: M is Ti, Zr, or Hf; $L_1$ is a $C_1$-$C_{15}$ fluoroalkyl, $C_2$-$C_{15}$ amide containing at least one fluoro group, $C_2$-$C_{15}$ carboxylate containing at least one fluoro group, or F; $L_2$ and $L_3$ are each independently a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H; and $R_1$-$R_5$ are each independently a $C_1$-$C_{15}$ alkyl, $C_1$-$C_{15}$ ether, $C_2$-$C_{15}$ amine, $C_1$-$C_{15}$ fluoroether, $C_1$-$C_{15}$ fluoroalkyl, OH, F, Cl, Br, I, or H.

In some aspects, the techniques described herein relate to a compound, the compound has the following formula:

(Formula 4)

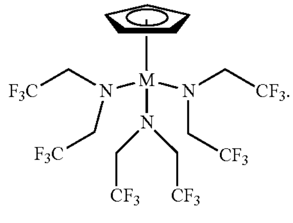

In some aspects, the techniques described herein relate to a compound, wherein $R_1$-$R_5$ are H.

In some aspects, the techniques described herein relate to a compound, wherein $L_1$-$L_3$ are 1,1,1,3,3,3-hexafluoro-2-propoxide, 2,2,3,3,4,4,4-heptafluoro-1-butoxide, 2,2,2-trifluoroethoxide.

In some aspects, the techniques described herein relate to a compound, wherein $L_1$-$L_3$ are trifluoroacetate.

In some aspects, the techniques described herein relate to a compound including the following formula:

(Formula 5)

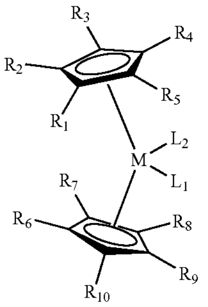

wherein M is Ti, Zr, or Hf; $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F; $L_2$ is a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H; and $R_1$-$R_{10}$ are each independently a $C_1$-$C_{15}$ alkyl, $C_1$-$C_{15}$ ether, $C_2$-$C_{15}$ amine, $C_1$-$C_{15}$ fluoroether, $C_1$-$C_{15}$ fluoroalkyl, OH, F, Cl, Br, I, or H.

In some aspects, the techniques described herein relate to a compound, wherein the compound has the following formula:

(Formula 6)

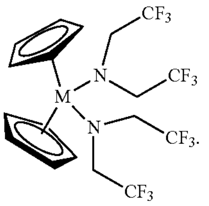

In some aspects, the techniques described herein relate to a compound, wherein $R_1$-$R_{10}$ are H.

In some aspects, the techniques described herein relate to a compound, wherein $L_1$ and $L_2$ are 2,2,3,3,4,4,4-Heptafluoro-1-butoxide, 1,1,1,3,3,3-hexafluoro-2-propoxide, 2,2,2-trifluoroethoxide, or combinations thereof.

In some aspects, the techniques described herein relate to a compound, wherein the compound has the following formula:

(Formula 7)

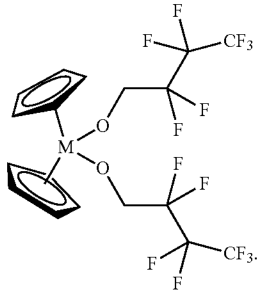

In some aspects, the techniques described herein relate to a compound or claim 12, wherein $L_1$ and $L_2$ are 2,2,2-trifluoroethoxide.

In some aspects, the techniques described herein relate to a compound including the following formula:

(Formula 8)

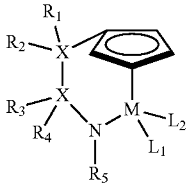

wherein M is Ti, Zr, or Hf; $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F; $L_2$ is a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H; X are each independently C or Si; and $R_1$-$R_5$ are each independently a $C_1$-$C_{15}$ alkyl, $C_1$-$C_{15}$ fluoroalkyl, or H.

In some aspects, the techniques described herein relate to a compound, wherein X are C, $R_1$-$R_4$ are H, and $R_5$ is a methyl.

In some aspects, the techniques described herein relate to a compound, wherein $L_1$ and $L_2$ are bis(2,2,2-trifluoroethyl) amido.

In some aspects, the techniques described herein relate to a compound, wherein $L_1$ and $L_2$ are 2,2,3,3,4,4,4-Heptafluoro-1-butoxide, 1,1,1,3,3,3-hexafluoro-2-propoxide, 2,2,2-trifluoroethoxide, or combinations thereof.

In some aspects, the techniques described herein relate to a compound, wherein $L_1$ and $L_2$ are trifluoroacetate.

In some aspects, the techniques described herein relate to a compound including the following formula:

(Formula 9)

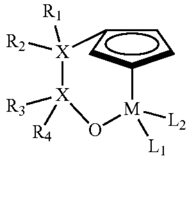

wherein: M is Ti, Zr, or Hf; $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F; $L_2$ is a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H; X are each independently C or Si; and $R_1$-$R_4$ are each independently a $C_1$-$C_{15}$ alkyl, $C_1$-$C_{15}$ fluoroalkyl, or H.

In some aspects, the techniques described herein relate to a compound, wherein X are C, $R_1$-$R_3$ are H, and $R_4$ is a methyl.

In some aspects, the techniques described herein relate to a compound, wherein $L_1$ and $L_2$ are bis(2,2,2-trifluoroethyl) amido.

In some aspects, the techniques described herein relate to a compound, wherein $L_1$ and $L_2$ are trifluoroacetate.

In some aspects, the techniques described herein relate to a compound, wherein $L_1$ and $L_2$ are 2,2,3,3,4,4,4-Heptafluoro-1-butoxide, 1,1,1,3,3,3-hexafluoro-2-propoxide, 2,2,2-trifluoroethoxide, or combinations thereof.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

FIG. 1 displays fluorinated ligand compounds according to the present disclosure, in accordance with some embodiments.

Figure 2:
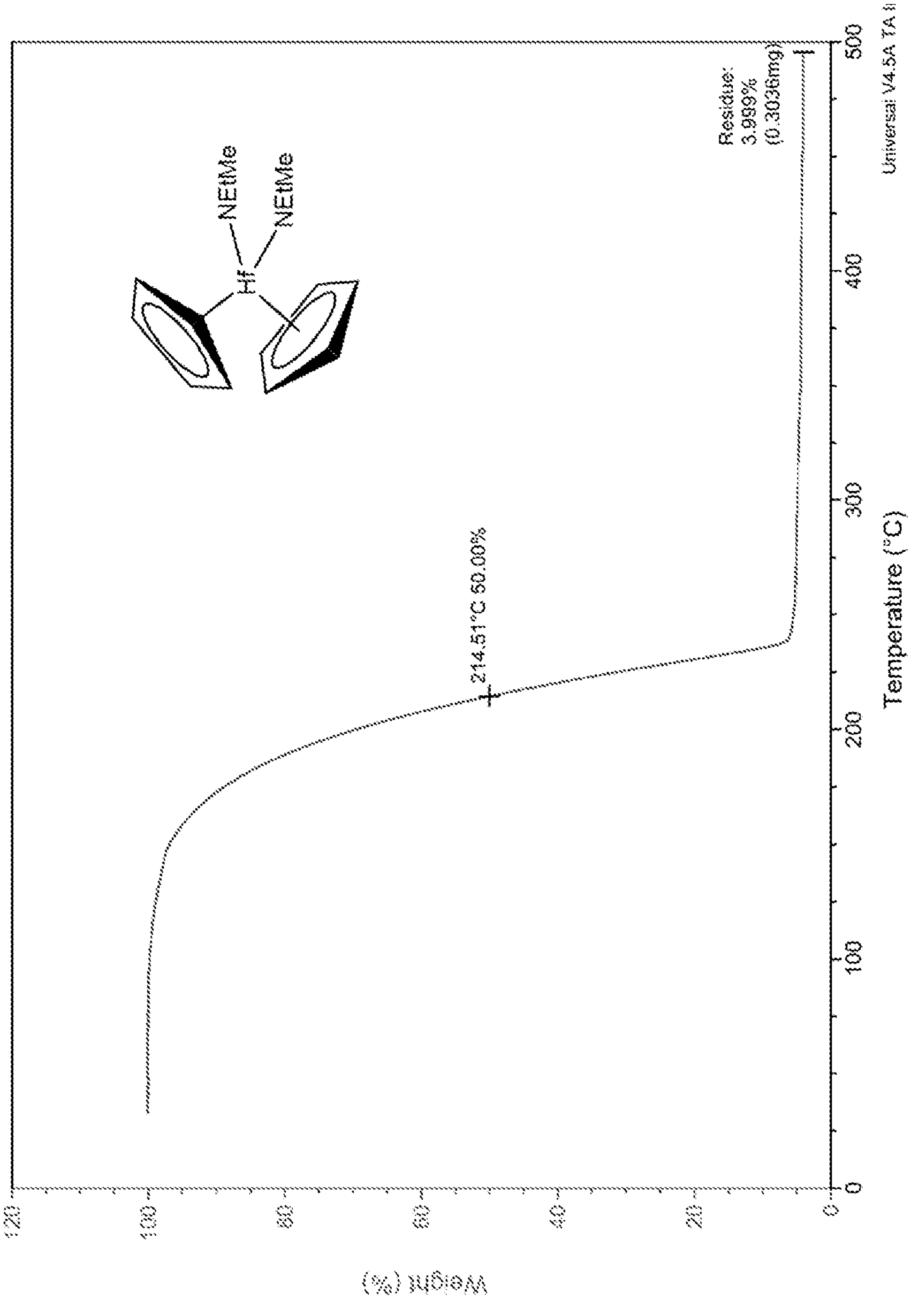

FIG. 2 displays thermogravimetric analysis (TGA) of a nonfluorinated compound: bis(cyclopentadienyl)Hf $(NEtMe)_2$.

Figure 3:
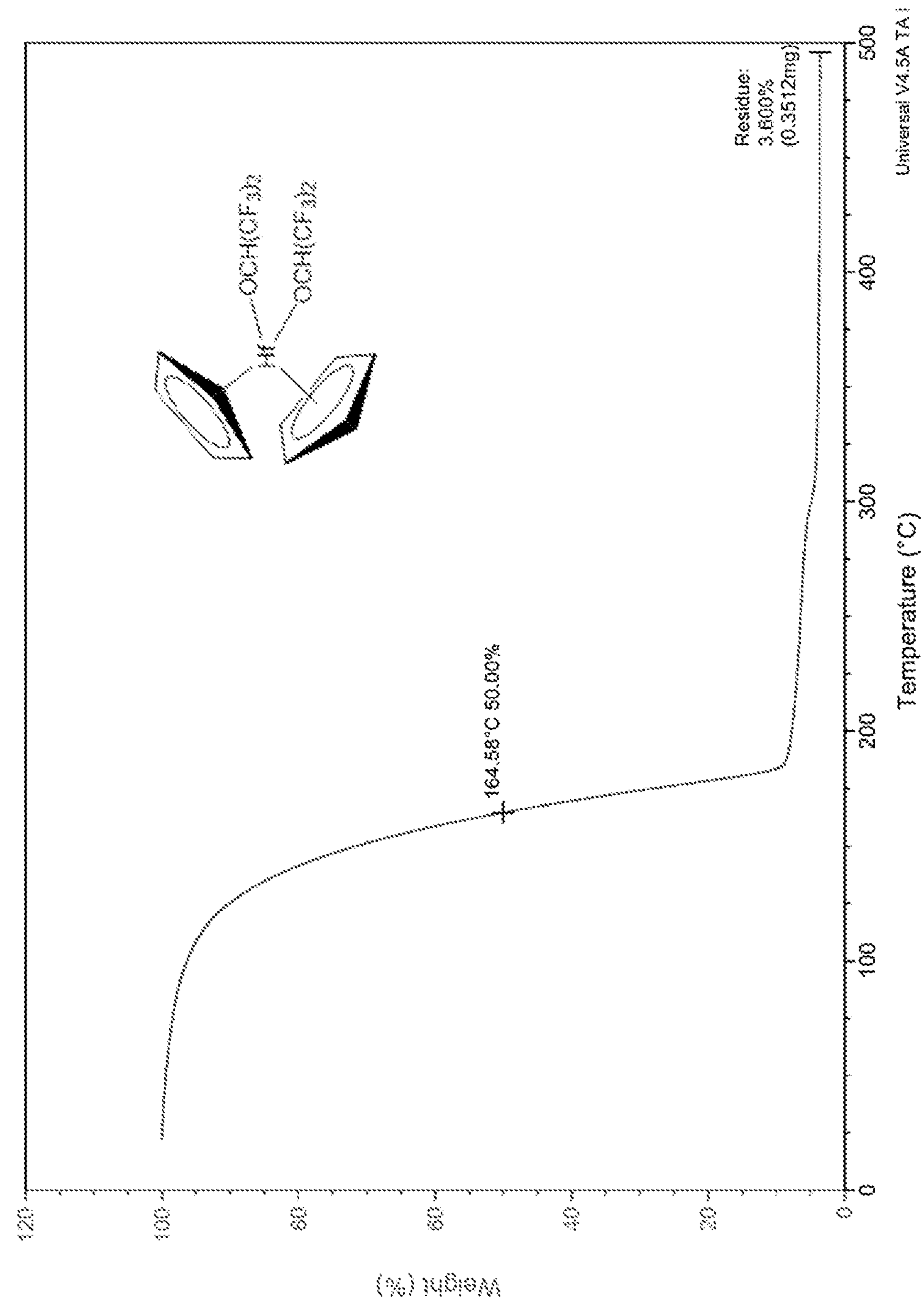

FIG. 3 displays TGA of bis(cyclopentadienyl)Hf$(OCH(CF_3)_2)_2$, in accordance with some embodiments.

Figure 4:
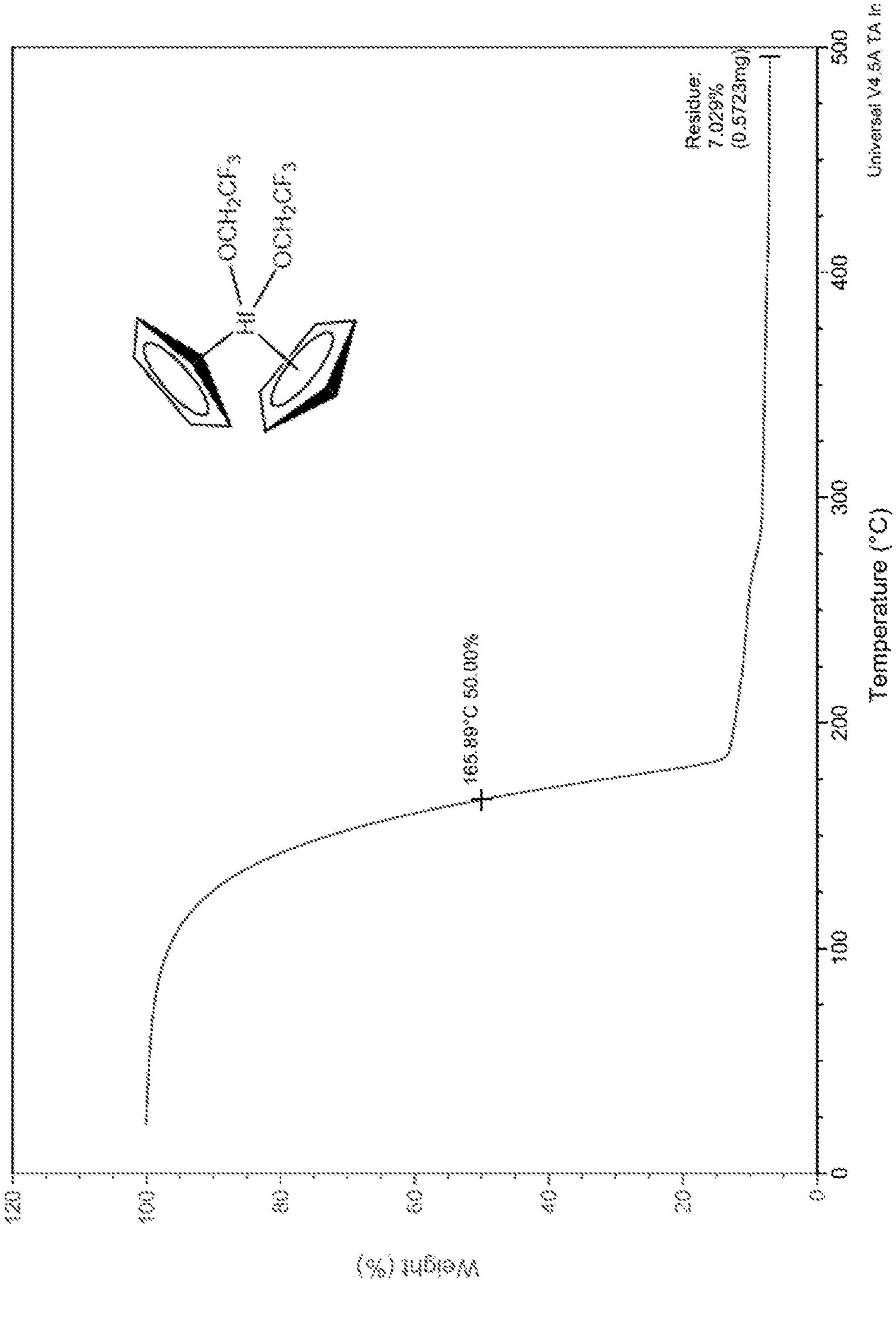

FIG. 4 displays TGA of bis(cyclopentadienyl)Hf $(OCH_2CF_3)_2$, in accordance with some embodiments.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "alkyl" refers to a hydrocarbon chain radical having from 1 to 30 carbon atoms. The alkyl may be attached via a single bond. An alkyl having n carbon atoms may be designated as a "Ce alkyl." For example, a "$C_3$ alkyl" may include n-propyl and isopropyl. An alkyl having a range of carbon atoms, such as 1 to 30 carbon atoms, may be designated as a $C_1$-$C_{30}$ alkyl. In some embodiments, the alkyl is saturated (e.g., single bonds). In some embodiments, the alkyl is unsaturated (e.g., double bonds and/or triple bonds). In some embodiments, the alkyl is linear. In some embodiments, the alkyl is branched. In some embodiments, the alkyl is substituted. In some embodiments, the alkyl is unsubstituted. In some embodiments, the alkyl may comprise, consist of, or consist essentially of, or may be selected from the group consisting of, at least one of a $C_1$-$C_{12}$ alkyl, a $C_1$-$C_{11}$ alkyl, a $C_1$-$C_{10}$ alkyl, a $C_1$-$C_9$ alkyl, a $C_1$-$C_8$ alkyl, a $C_1$-$C_7$ alkyl, a $C_1$-$C_6$ alkyl, a $C_1$-$C_4$ alkyl, a $C_1$-$C_3$ alkyl, or any combination thereof. In some embodiments, the alkyl may comprise, consist of, or consist essentially of, or may be selected from the group consisting of, at least one of methyl, ethyl, n-propyl, 1-methylethyl (iso-propyl), n-butyl, iso-butyl, sec-butyl, n-pentyl, 1,1-dimethylethyl (t-butyl), n-pentyl, iso-pentyl, n-hexyl, isohexyl, 3-methylhexyl, 2-methylhexyl, octyl, decyl, dodecyl, octadecyl, or any combination thereof.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

There is a need for new precursors for applications related to 3D-NAND, DRAM, and Logic. As tungsten is replaced by molybdenum in 3D-NAND, a blocking layer is needed to protect the aluminum oxide ($Al_2O_3$). The present disclosure relates to the field of precursors, more specifically precursors containing at least one fluorinated group. In some embodiments, the precursors are hafnium, zirconium, and titanium bis(cyclopentadienyl) precursors containing fluorinated alkoxides and amides. In some embodiments, the present disclosure relates to using the precursors as described herein for deposition of group 4 containing thin films, such as HfOx, ZrOx, and TiOx film applications. These thin films can be used in a variety of applications including semiconductor device structures. The compounds of the present disclosure have been developed and synthesized to generate compounds that provide improvements in film applications, such as HfOx, ZrOx, and TiOx film applications. The improvements to the compounds of the present disclosure include increased molecule stability at delivery temperature and deposition temperature, improvements related to precursor film impurity levels, molecule volatility, molecule melting point, and step coverage.

The precursors of the present disclosure have good stability and volatility. For example, bis(cyclopentadienyl) Hf compounds containing fluorinated ligands can have significantly higher volatility than compounds containing non-fluorinated ligands.

In some embodiments, the compound of the present disclosure comprises a compound with the following formula:

(Formula 1)

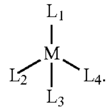

In some embodiments, for Formula 1, M is titanium (Ti), zirconium (Zr), or hafnium (Hf).

In some embodiments, for Formula 1, $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F.

In some embodiments, for Formula 1, $L_2$-$L_4$ are each independently an alkyl, amide, alkoxide, carboxylate, amidinate, guanidinate, β-diketonate, β-ketoiminate, β-diketiminate, fluoroalkyl, alkoxide containing at least one fluoro group, amide containing at least one fluoro group, carboxylate containing at least one fluoro group, F, Cl, Br, I, or H. In some embodiments, for Formula 1, $L_2$-$L_4$ are each independently a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H. For example, $L_2$-$L_4$ are a $C_1$-$C_{15}$ alkyl (e.g., methyl). For example, $L_2$-$L_4$ are a $C_1$-$C_{15}$ alkyl, where $L_2$ is methyl, $L_3$ is ethyl, and $L_4$ is butyl. For example, $L_2$ is a $C_2$-$C_{15}$ amide, $L_3$ is a $C_1$-$C_{15}$ alkoxide, and $L_4$ is a $C_5$-$C_{15}$ amidinate.

In some embodiments, $L_1$-$L_4$ are the same class of ligand (e.g., $C_1$-$C_{15}$ alkyl) or the same ligand (e.g., methyl). In some embodiments, $L_1$-$L_4$ are the same class of ligand (e.g., $C_1$-$C_{15}$ alkyl) but different ligands (e.g., $L_1$ is methyl, $L_2$ is ethyl, $L_3$ is propyl, and $L_4$ is butyl). In some embodiments, $L_1$-$L_4$ are all different classes of ligand (e.g., $L_1$ is a $C_1$-$C_{15}$ alkyl, $L_2$ is a $C_2$-$C_{15}$ amide, $L_3$ is a $C_1$-$C_{15}$ carboxylate, and $L_4$ is a $C_1$-$C_{15}$ alkoxide). In some embodiments, at least one of $L_1$-$L_4$ are the same class of ligand (e.g., $L_1$ and $L_2$ are $C_1$-$C_{15}$ alkyl, $L_3$ is a $C_1$-$C_{15}$ carboxylate, and $L_4$ is a $C_1$-$C_{15}$ alkoxide).

In some embodiments, for Formula 1, $L_1$-$L_4$ are $C_2$-$C_{15}$ amide containing at least one fluoro group (e.g. bis(2,2,2-trifluoroethyl)amido)). For example, Formula 2 represents the formula for when $L_1$-$L_4$ are bis(2,2,2-trifluoroethyl) amido) for Formula 1, as shown below:

(Formula 2)

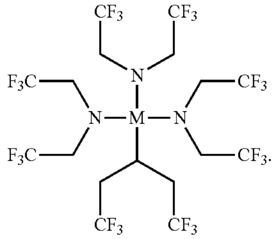

In some embodiments, for Formula 1, $L_1$-$L_4$ are each independently 1,1,1,3,3,3-hexafluoro-2-propoxide, 2,2,3,3,4,4,4-Heptafluoro-1-butoxide, or 2,2,2-trifluoroethoxide. For example, in some embodiments, $L_1$-$L_4$ are 1,1,1,3,3,3-hexafluoro-2-propoxide, $L_1$-$L_4$ 2,2,3,3,4,4,4-Heptafluoro-1-butoxide, 2,2,2-trifluoroethoxide, or combinations thereof.

In some embodiments, for Formula 1, $L_1$-$L_4$ are $C_2$-$C_{15}$ carboxylate containing at least one fluoro group (e.g., trifluoroacetate).

In some embodiments, the compound of the present disclosure comprises a compound with the following formula:

(Formula 3)

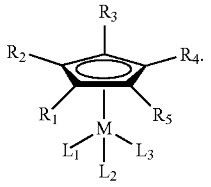

In some embodiments, for Formula 3, M is titanium (Ti), zirconium (Zr), or hafnium (Hf).

In some embodiments, for Formula 3, $L_1$ is a $C_1$-$C_{15}$ fluoroalkyl, $C_2$-$C_{15}$ amide containing at least one fluoro group, $C_2$-$C_{15}$ carboxylate containing at least one fluoro group, or F.

In some embodiments, for Formula 3, $L_2$ and $L_3$ are each independently an alkyl, amide, alkoxide, carboxylate, amidinate, guanidinate, β-diketonate, β-ketoiminate, β-diketiminate, fluoroalkyl, alkoxide containing at least one fluoro group, amide containing at least one fluoro group, carboxylate containing at least one fluoro group, F, Cl, Br, I, or H. In some embodiments, for Formula 3, $L_2$ and $L_3$ are each independently a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H.

In some embodiments, for Formula 3, $L_1$-$L_3$ are the same class of ligand (e.g., $C_1$-$C_{15}$ alkyl) or the same ligand (e.g., methyl). In some embodiments, $L_1$-$L_3$ are the same class of ligand (e.g., $C_1$-$C_{15}$ alkyl) but different ligands (e.g., $L_1$ is methyl, $L_2$ is ethyl, and $L_3$ is propyl). In some embodiments, $L_1$-$L_3$ are all different classes of ligand (e.g., $L_1$ is a $C_1$-$C_{15}$ alkyl, $L_2$ is a $C_2$-$C_{15}$ amide, and $L_3$ is a $C_1$-$C_{15}$ carboxylate). In some embodiments, at least one of $L_1$-$L_3$ are the same class of ligand (e.g., $L_1$ and $L_2$ are $C_1$-$C_{15}$ alkyl and $L_3$ is a $C_1$-$C_{15}$ carboxylate).

In some embodiments, for Formula 3, $R_1$-$R_5$ are each independently a $C_1$-$C_{15}$ alkyl, $C_1$-$C_{15}$ ether, $C_2$-$C_{15}$ amine, $C_1$-$C_{15}$ fluoroether, $C_1$-$C_{15}$ fluoroalkyl, OH, F, $C_1$, Br, I, or H.

In some embodiments, $R_1$-$R_5$ are the same class of functional group (e.g., $C_1$-$C_{15}$ alkyl) or the same functional group (e.g., methyl). In some embodiments, $R_1$-$R_5$ are the same class of functional group (e.g., $C_1$-$C_{15}$ alkyl) but different functional groups (e.g., $R_1$ is methyl, $R_2$ is ethyl, $R_3$ is propyl, $R_4$ is butyl, and $R_5$ is pentyl). In some embodiments, $R_1$-$R_5$ are all different classes of functional group (e.g., $R_1$ is a $C_1$-$C_{15}$ alkyl, $R_2$ is a $C_2$-$C_{15}$ amine, $R_3$ is a $C_1$-$C_{15}$ ether, $R_4$ is a $C_1$-$C_{15}$ fluoroether, and $R_5$ is H). In some embodiments, at least one of $R_1$-$R_5$ are the same class of functional group (e.g., $R_1$ and $R_2$ are $C_1$-$C_{15}$ alkyl and $R_3$-$R_5$ is a $C_1$-$C_{15}$ fluoroalkyl).

In some embodiments, for Formula 3, $L_1$-$L_3$ are $C_2$-$C_{15}$ amide containing at least one fluoro group (e.g., bis(2,2,2-trifluoroethyl)amido). For example, Formula 4 represents the compound for when $R_1$-$R_5$ are H and $L_1$-$L_3$ are bis(2,2,2-trifluoroethyl)amido for Formula 3, as shown below:

(Formula 4)

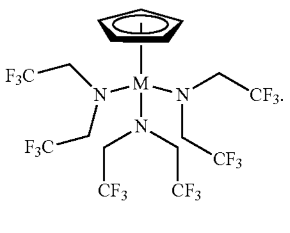

In some embodiments, for Formula 3, $R_1$-$R_5$ are H.

In some embodiments, for Formula 3, $L_1$-$L_3$ are $C_1$-$C_{15}$ alkoxides containing at least one fluoro group (e.g., 1,1,1,3,3,3-hexafluoro-2-propoxide, 2,2,3,3,4,4,4-heptafluoro-1-butoxide, or 2,2,2-trifluoroethoxide). In some embodiments, for Formula 3, $R_1$-$R_5$ are H and $L_1$-$L_3$ are 1,1,1,3,3,3-hexafluoro-2-propoxide. In some embodiments, for Formula 3, $R_1$-$R_5$ are H and $L_1$-$L_3$ are 2,2,3,3,4,4,4-heptafluoro-1-butoxide.

In some embodiments, for Formula 3, $R_1$-$R_5$ are H and $L_1$-$L_3$ are 2,2,2-trifluoroethoxide.

In some embodiments, for Formula 3, $L_1$-$L_3$ are a $C_2$-$C_{15}$ carboxylate containing at least one fluoro group (e.g., trifluoroacetate). In some embodiments, for Formula 3, $R_1$-$R_5$ are H and $L_1$-$L_3$ are trifluoroacetate.

In some embodiments, the compound of the present disclosure comprises a compound with the following formula:

(Formula 5)

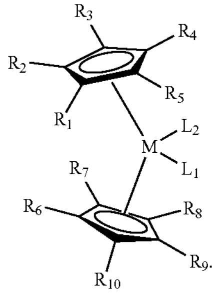

In some embodiments, for Formula 5, M is titanium (Ti), zirconium (Zr), or hafnium (Hf).

In some embodiments, for Formula 5, $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F.

In some embodiments, for Formula 5, $L_2$ is an alkyl, amide, alkoxide, carboxylate, amidinate, guanidinate, β-diketonate, β-ketoiminate, β-diketiminate, fluoroalkyl, alkoxide containing at least one fluoro group, amide containing at least one fluoro group, carboxylate containing at least one fluoro group, F, Cl, Br, I, or H. In some embodiments, for Formula 5, $L_2$ is a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H.

In some embodiments, for Formula 5, $L_1$ and $L_2$ are the same class of functional group (e.g., $C_1$-$C_{15}$ alkyl) or the same functional group (e.g., methyl). In some embodiments, $L_1$ and $L_2$ are the same class of ligand (e.g., $C_1$-$C_{15}$ alkyl) but different ligands (e.g., $L_1$ is methyl and $L_2$ is ethyl). In some embodiments, $L_1$ and $L_2$ are all different classes of ligands (e.g., $L_1$ is a $C_1$-$C_{15}$ alkyl and $L_2$ is a $C_2$-$C_{15}$ amide).

In some embodiments, for Formula 5, $R_1$-$R_{10}$ are each independently a $C_1$-$C_{15}$ alkyl, $C_1$-$C_{15}$ ether, $C_2$-$C_{15}$ amine, $C_1$-$C_{15}$ fluoroether, $C_1$-$C_{15}$ fluoroalkyl, OH, F, $C_1$, Br, I, or H.

In some embodiments, $R_1$-$R_{10}$ are the same class of functional group (e.g., $C_1$-$C_{15}$ alkyl) or the same functional group (e.g., methyl). In some embodiments, $R_1$-$R_{10}$ are the same class of functional group (e.g., $C_1$-$C_{15}$ alkyl) but different functional groups (e.g., $R_1$ is methyl, $R_2$ is ethyl, $R_3$ is propyl, $R_4$ is butyl, $R_5$ is pentyl, etc.). In some embodiments, $R_1$-$R_{10}$ are all different classes of functional group (e.g., $R_1$ is a $C_1$-$C_{15}$ alkyl, $R_2$ is a $C_2$-$C_{15}$ amine, $R_3$ is a $C_1$-$C_{15}$ ether, $R_4$ is a $C_1$-$C_{15}$ fluoroether, $R_5$ is H, etc.). In some embodiments, at least one of $R_1$-$R_{10}$ are the same class of functional group (e.g., $R_1$-$R_5$ are $C_1$-$C_{15}$ alkyl and $R_6$-$R_{10}$ are a $C_1$-$C_{15}$ fluoroalkyl).

In some embodiments, for Formula 5, $L_1$ and $L_2$ are $C_2$-$C_{15}$ amide containing at least one fluoro group (e.g., bis(2,2,2-trifluoroethyl)amido). For example, Formula 6 represents the compound for when $R_1$-$R_{10}$ are H and $L_1$ and $L_2$ are bis(2,2,2-trifluoroethyl)amido represented by structural formula 5, as shown below:

(Formula 6)

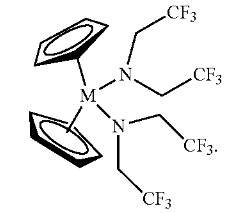

In some embodiments, for Formula 5, $R_1$-$R_{10}$ are H.

In some embodiments, for Formula 5, $L_1$ and $L_2$ are a $C_1$-$C_{15}$ alkoxide containing at least one fluoro group (e.g., 2,2,3,3,4,4,4-Heptafluoro-1-butoxide, 1,1,1,3,3,3-hexafluoro-2-propoxide, or 2,2,2-trifluoroethoxide. In some embodiments, for Formula 5, $R_1$-$R_{10}$ are H, and $L_1$ and $L_2$ are 2,2,3,3,4,4,4-Heptafluoro-1-butoxide. In some embodiments, for Formula 5, $R_1$-$R_{10}$ are H, and $L_1$ and $L_2$ are 1,1,1,3,3,3-hexafluoro-2-propoxide. In some embodiments, for Formula 5, $R_1$-$R_{10}$ are H, and $L_1$ and $L_2$ are 2,2,2-trifluoroethoxide.

For example, Formula 7 represents the compound for when $R_1$-$R_{10}$ are H and $L_1$ and $L_2$ are 2,2,3,3,4,4,4-heptafluoro-1-butoxide for Formula 5, as shown below: represented by structural formula 7:

(Formula 7)

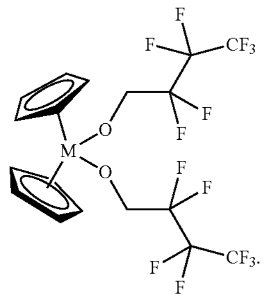

In some embodiments, for Formula 5, $L_1$ and $L_2$ are $C_2$-$C_{15}$ carboxylate containing at least one fluoro group (e.g., trifluoroacetate).

In some embodiments, the compound of the present disclosure comprises a compound with the following formula:

(Formula 8)

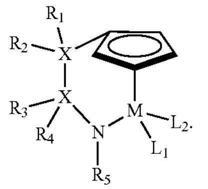

In some embodiments, for Formula 8, M is titanium (Ti), zirconium (Zr), or hafnium (Hf).

In some embodiments, for Formula 8, $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F.

In some embodiments, for Formula 8, $L_2$ is an alkyl, amide, alkoxide, carboxylate, amidinate, guanidinate, β-diketonate, β-ketoiminate, β-diketiminate, fluoroalkyl, alkoxide containing at least one fluoro group, amide containing at least one fluoro group, carboxylate containing at least one fluoro group, F, Cl, Br, I, or H. In some embodiments, for Formula 8, $L_2$ is a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H.

In some embodiments, for Formula 8, $L_1$ and $L_2$ are the same class of ligand (e.g., $C_1$-$C_{15}$ alkyl) or the same ligand (e.g., methyl). In some embodiments, $L_1$ and $L_2$ are the same class of ligand (e.g., $C_1$-$C_{15}$ alkyl) but different ligands (e.g., $L_1$ is methyl and $L_2$ is ethyl). In some embodiments, $L_1$ and $L_2$ are all different classes of ligand (e.g., $L_1$ is a $C_1$-$C_{15}$ alkyl and $L_2$ is a $C_2$-$C_{15}$ amide).

In some embodiments, for Formula 8, X are each independently C or Si. In some embodiments, for Formula 8, both Xs are C or Si. In some embodiments, for Formula 8, one X is C and one X is Si.

In some embodiments, for Formula 8, $R_1$-$R_5$ are each independently a $C_1$-$C_{15}$ alkyl, $C_1$-$C_{15}$ fluoroalkyl, or H.

In some embodiments, $R_1$-$R_5$ are the same class of functional group (e.g., $C_1$-$C_{15}$ alkyl) or the same functional group (e.g., methyl). In some embodiments, $R_1$-$R_5$ are the same class of functional group (e.g., $C_1$-$C_{15}$ alkyl) but different functional groups (e.g., $R_1$ is methyl, $R_2$ is ethyl, $R_3$ is propyl, $R_4$ is butyl, and $R_5$ is pentyl). In some embodiments, $R_1$-$R_5$ are all different classes of functional group (e.g., $R_1$ is a $C_1$-$C_{15}$ alkyl, $R_2$ is a $C_2$-$C_{15}$ amine, $R_3$ is a $C_1$-$C_{15}$ ether, $R_4$ is a $C_1$-$C_{15}$ fluoroether, and $R_5$ is H). In some embodiments, at least one of $R_1$-$R_5$ are the same class of functional group (e.g., $R_1$ and $R_2$ are $C_1$-$C_{15}$ alkyl and $R_3$-$R_5$ is a $C_1$-$C_{15}$ fluoroalkyl).

In some embodiments, for Formula 8, X are C, $R_1$-$R_4$ are H, and $R_5$ is a methyl.

In some embodiments, for Formula 8, $L_1$ and $L_2$ are $C_2$-$C_{15}$ amide containing at least one fluoro group (e.g., bis(2,2,2-trifluoroethyl)amido). In some embodiments, for Formula 8, X are C, $R_1$-$R_4$ are H, $R_5$ is a methyl, and $L_1$ and $L_2$ are bis(2,2,2-trifluoroethyl)amido.

In some embodiments, for Formula 8, $L_1$ and $L_2$ are a $C_1$-$C_{15}$ alkoxide containing at least one fluoro group (e.g., 2,2,3,3,4,4,4-Heptafluoro-1-butoxide, 1,1,1,3,3,3-hexafluoro-2-propoxide, or 2,2,2-trifluoroethoxide).

In some embodiments, for Formula 8, $L_1$ and $L_2$ are $L_1$ and $L_2$ are a $C_2$-$C_{15}$ carboxylate containing at least one fluoro group (e.g., trifluoroacetate).

In some embodiments, the compound of the present disclosure comprises a compound with the following formula:

(Formula 9)

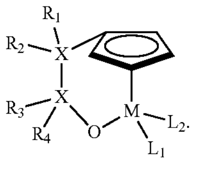

In some embodiments, for Formula 9, M is titanium (Ti), zirconium (Zr), or hafnium (Hf).

In some embodiments, for Formula 9, $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F.

In some embodiments, for Formula 9, $L_2$ is an alkyl, amide, alkoxide, carboxylate, amidinate, guanidinate, β-diketonate, β-ketoiminate, β-diketiminate, fluoroalkyl, alkoxide containing at least one fluoro group, amide containing at least one fluoro group, carboxylate containing at least one fluoro group, F, Cl, Br, I, or H. In some embodiments, for Formula 9, $L_2$ is a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H.

In some embodiments, for Formula 9, $L_1$ and $L_2$ are the same class of ligand (e.g., $C_1$-$C_{15}$ alkyl) or the same ligand (e.g., methyl). In some embodiments, $L_1$ and $L_2$ are the same class of ligand (e.g., $C_1$-$C_{15}$ alkyl) but different ligands (e.g., $L_1$ is methyl and $L_2$ is ethyl). In some embodiments, $L_1$ and $L_2$ are all different classes of ligand (e.g., $L_1$ is a $C_1$-$C_{15}$ alkyl and $L_2$ is a $C_2$-$C_{15}$ amide).

In some embodiments, for Formula 9, X are each independently C or Si. In some embodiments, for Formula 9, both Xs are C or Si. In some embodiments, for Formula 8, one X is C and one X is Si.

In some embodiments, for Formula 9, $R_1$-$R_4$ are each independently a $C_1$-$C_{15}$ alkyl, $C_1$-$C_{15}$ fluoroalkyl, or H.

In some embodiments, for Formula 9, X are C, $R_1$-$R_3$ are H, and $R_4$ is a methyl.

In some embodiments, for Formula 9, $L_1$ and $L_2$ are a $C_2$-$C_{15}$ amide containing at least one fluoro group (e.g., bis(2,2,2-trifluoroethyl)amido). In some embodiments, for Formula 9, X are C, $R_1$-$R_3$ are H, $R_4$ is a methyl, and $L_1$ and $L_2$ are bis(2,2,2-trifluoroethyl)amido.

In some embodiments, for Formula 9, $L_1$ and $L_2$ are a $C_2$-$C_{15}$ carboxylate containing at least one fluoro group (e.g., trifluoroacetate). In some embodiments, for Formula 9, X are C, $R_1$-$R_3$ are H, $R_4$ is a methyl, and $L_1$ and $L_2$ are trifluoroacetate.

In some embodiments, for Formula 9, $L_1$ and $L_2$ are a $C_1$-$C_{15}$ alkoxide containing at least one fluoro group (e.g., 2,2,3,3,4,4,4-Heptafluoro-1-butoxide, 1,1,1,3,3,3-hexafluoro-2-propoxide, or 2,2,2-trifluoroethoxide). In some embodiments, for Formula 9, X are C, $R_1$-$R_3$ are H, $R_4$ is a methyl, and $L_1$ and $L_2$ are 2,2,3,3,4,4,4-Heptafluoro-1-butoxide, 1,1,1,3,3,3-hexafluoro-2-propoxide, or 2,2,2-trifluoroethoxide.

FIG. 1 displays fluorinated ligand compounds (fluorinated L groups (e.g., $L_1$, $L_2$, $L_3$, and $L_4$) for Formula 1-Formula 9) according to the present disclosure, in accordance with some embodiments.

As a comparative example for fluorinated and nonfluorinated compounds, FIG. 2 displays thermogravimetric analysis (TGA) of a nonfluorinated compound: bis(cyclopentadienyl)Hf(NEtMe)$_2$.

FIG. 3 displays TGA of bis(cyclopentadienyl)Hf(OCH(CF$_3$)$_2$)$_2$, in accordance with some embodiments.

FIG. 4 displays TGA of bis(cyclopentadienyl)Hf(OCH$_2$CF$_3$)$_2$, in accordance with some embodiments.

Aspects

Various Aspects are described below. It is to be understood that any one or more of the features recited in the following Aspect(s) can be combined with any one or more other Aspect(s).

Aspect 1. A compound comprising the following formula:

(Formula 1)

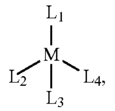

wherein: M is Ti, Zr, or Hf; $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F; and $L_2$-$L_4$ are each independently a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H.

Aspect 2. The compound of Aspect 1, wherein the compound has the following formula:

(Formula 2)

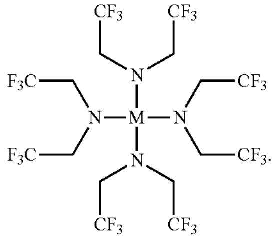

Aspect 3. The compound of Aspect 1, wherein $L_1$-$L_4$ are each independently 1,1,1,3,3,3-hexafluoro-2-propoxide, 2,2,3,3,4,4,4-Heptafluoro-1-butoxide, or 2,2,2-trifluoroethoxide.

Aspect 4. The compound of Aspect 1, wherein $L_1$-$L_4$ are trifluoroacetate.

Aspect 5. A compound comprising the following formula:

(Formula 3)

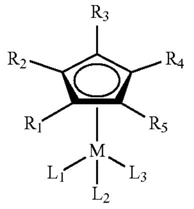

wherein: M is Ti, Zr, or Hf; $L_1$ is a $C_1$-$C_{15}$ fluoroalkyl, $C_2$-$C_{15}$ amide containing at least one fluoro group, $C_2$-$C_{15}$ carboxylate containing at least one fluoro group, or F; $L_2$ and $L_3$ are each independently a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H; and $R_1$-$R_5$ are each independently a $C_1$-$C_{15}$ alkyl, $C_1$-$C_{15}$ ether, $C_2$-$C_{15}$ amine, $C_1$-$C_{15}$ fluoroether, $C_1$-$C_{15}$ fluoroalkyl, OH, F, Cl, Br, I, or H.

Aspect 6. The compound of claim 5, the compound has the following formula:

(Formula 4)

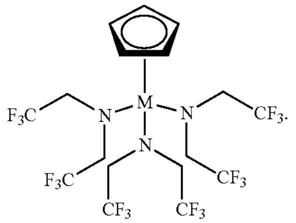

Aspect 7. The compound of Aspect 5, wherein $R_1$-$R_5$ are H.

Aspect 8. The compound of Aspect 5 or Aspect 6, wherein $L_1$-$L_3$ are 1,1,1,3,3,3-hexafluoro-2-propoxide, 2,2,3,3,4,4,4-heptafluoro-1-butoxide, 2,2,2-trifluoroethoxide.

Aspect 9. The compound of Aspect 5 or Aspect 6, wherein $L_1$-$L_3$ are trifluoroacetate.

Aspect 10. A compound comprising the following formula:

(Formula 5)

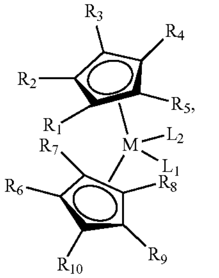

wherein: M is Ti, Zr, or Hf; $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F; $L_2$ is a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H; and $R_1$-$R_{10}$ are each independently a $C_1$-$C_{15}$ alkyl, $C_1$-$C_{15}$ ether, $C_2$-$C_{15}$ amine, $C_1$-$C_{15}$ fluoroether, $C_1$-$C_{15}$ fluoroalkyl, OH, F, Cl, Br, I, or H.

Aspect 11. The compound of Aspect 10, wherein the compound has the following formula:

(Formula 6)

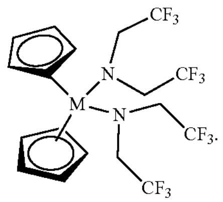

Aspect 12. The compound of Aspect 10, wherein $R_1$-$R_{10}$ are H.

Aspect 13. The compound of Aspect 10 or Aspect 12, wherein $L_1$ and $L_2$ are 2,2,3,3,4,4,4-Heptafluoro-1-butoxide, 1,1,1,3,3,3-hexafluoro-2-propoxide, 2,2,2-trifluoroethoxide, or combinations thereof.

Aspect 14. The compound of Aspect 10, wherein the compound has the following formula:

(Formula 7)

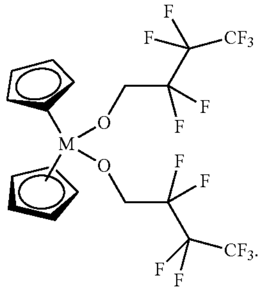

Aspect 15. The compound of Aspect 10 or Aspect 12, wherein $L_1$ and $L_2$ are 2,2,2-trifluoroethoxide.

Aspect 16. A compound comprising the following formula:

(Formula 8)

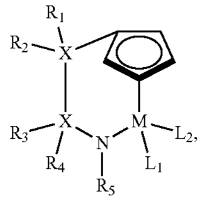

wherein: M is Ti, Zr, or Hf; $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F; $L_2$ is a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H; X are each independently C or Si; and $R_1$-$R_5$ are each independently a $C_1$-$C_{15}$ alkyl, $C_1$-$C_{15}$ fluoroalkyl, or H.

Aspect 17. The compound of Aspect 16, wherein X are C, $R_1$-$R_4$ are H, and $R_5$ is a methyl.

Aspect 18. The compound of Aspect 16 or Aspect 17, wherein $L_1$ and $L_2$ are bis(2,2,2-trifluoroethyl)amido.

Aspect 19. The compound of Aspect 16 or Aspect 17, wherein $L_1$ and $L_2$ are 2,2,3,3,4,4,4-Heptafluoro-1-butoxide, 1,1,1,3,3,3-hexafluoro-2-propoxide, 2,2,2-trifluoroethoxide, or combinations thereof.

Aspect 20. The compound of Aspect 16 or Aspect 17, wherein $L_1$ and $L_2$ are trifluoroacetate.

Aspect 21. A compound comprising the following formula:

(Formula 9)

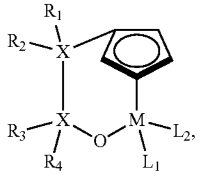

wherein: M is Ti, Zr, or Hf; $L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F; $L_2$ is a $C_1$-$C_{15}$ alkyl, $C_2$-$C_{15}$ amide, $C_1$-$C_{15}$ alkoxide, $C_1$-$C_{15}$ carboxylate, $C_5$-$C_{15}$ amidinate, $C_5$-$C_{15}$ guanidinate, $C_5$-$C_{15}$ β-diketonate, $C_5$-$C_{15}$ β-ketoiminate, $C_5$-$C_{15}$ β-diketiminate, $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, F, Cl, Br, I, or H; X are each independently C or Si; and $R_1$-$R_4$ are each independently a $C_1$-$C_{15}$ alkyl, $C_1$-$C_{15}$ fluoroalkyl, or H.

Aspect 22. The compound of Aspect 21, wherein X are C, $R_1$-$R_3$ are H, and $R_4$ is a methyl.

Aspect 23. The compound of Aspect 21 or Aspect 22, wherein $L_1$ and $L_2$ are bis(2,2,2-trifluoroethyl)amido.

Aspect 24. The compound of Aspect 21 or Aspect 22, wherein $L_1$ and $L_2$ are trifluoroacetate.

Aspect 25. The compound of Aspect 21 or Aspect 22, wherein $L_1$ and $L_2$ are 2,2,3,3,4,4,4-Heptafluoro-1-butoxide, 1,1,1,3,3,3-hexafluoro-2-propoxide, 2,2,2-trifluoroethoxide, or combinations thereof.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A compound comprising the following formula:

(Formula 1)

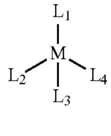

wherein M is Hf;

$L_1$ is a $C_1$-$C_{15}$ fluoroalkyl, $C_1$-$C_{15}$ alkoxide containing at least one fluoro group, $C_2$-$C_{15}$ amide containing at least one fluoro group, $C_2$-$C_{15}$ carboxylate containing at least one fluoro group, or F; and $L_2$-$L_4$ are each —$N(CH_2CF_3)_2$, $C_1$-$C_{15}$ alkoxide containing at least one fluoro group, $C_2$-$C_{15}$ carboxylate containing at least one fluoro group, wherein $L_2$-$L_4$ may include multiple instances of the same group or may include different groups selected from the recited options.

2. The compound of claim 1, wherein the compound has the following formula:

(Formula 2)

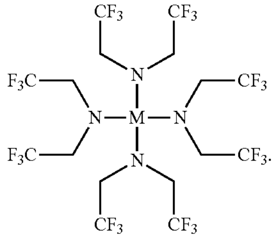

3. The compound of claim 1, wherein $L_1$-$L_4$ are each independently 1,1,1,3,3,3-hexafluoro-2-propoxide, 2,2,3,3,4,4,4-Heptafluoro-1-butoxide, or 2,2,2-trifluoroethoxide.

4. The compound of claim 1, wherein $L_1$-$L_4$ are trifluoroacetate.

5. A compound comprising the following formula:

(Formula 2)

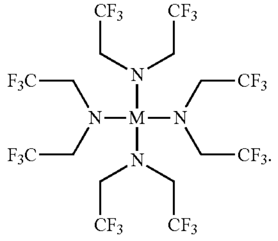

wherein: M is Ti, Zr, or Hf.

6. A compound comprising the following formula:

(Formula 1)

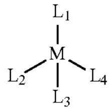

wherein:

M is Zr or Hf; and $L_1$-$L_4$ are trifluoroacetate.

7. The compound of claim 6, wherein Mis Hf.

8. The compound of claim 1, wherein $L_1$-$L_4$ are the only groups attached to M.

9. A method of depositing a hafnium-containing film on a substrate comprising:

volatilizing a compound of claim 1; and contacting the substrate with the volatilized compound of claim 1 under vapor deposition conditions to form a hafnium-containing film.

10. The method of claim 9, wherein the hafnium-containing film is a hafnium oxide film.

11. A method of depositing a titanium-containing, a hafnium-containing, or a zirconium-containing film on a substrate comprising: volatilizing a compound of claim 5; and contacting the substrate with the volatilized compound of claim 5 under vapor deposition conditions to form the titanium-containing, hafnium-containing, or zirconium-containing film.

12. The method of claim 11, wherein the titanium-containing, hafnium-containing, or zirconium-containing film in an oxide film.

13. A method of depositing a hafnium-containing or a zirconium-containing film on a substrate comprising: volatilizing a compound of claim 6; and contacting the substrate with the volatilized compound of claim 6 under vapor deposition conditions to form the hafnium-containing film or the zirconium-containing.

14. The method of claim 13, wherein the hafnium-containing or zirconium-containing film in an oxide film.

* * * * *